(12) United States Patent
Nickerson

(10) Patent No.: US 6,526,159 B1
(45) Date of Patent: Feb. 25, 2003

(54) EYE TRACKING FOR RESOURCE AND POWER MANAGEMENT

(75) Inventor: Brian R. Nickerson, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/224,411

(22) Filed: Dec. 31, 1998

(51) Int. Cl.[7] .................................................. G06K 9/00
(52) U.S. Cl. .......................... 382/117; 345/7; 345/156; 382/103; 351/210; 351/246
(58) Field of Search .................. 382/103, 117, 382/165, 181, 190, 199; 345/7, 156–158; 351/209–210, 246

(56) References Cited

U.S. PATENT DOCUMENTS 5,898,423 A * 4/1999 Tognazzini et al. ......... 345/158
5,912,721 A * 6/1999 Yamaguchi et al. ........ 351/210
6,091,378 A * 7/2000 Richardson et al. ........... 345/7

OTHER PUBLICATIONS

Nayar et al., "Real–Time Focus Range Sensor," white paper, 7 pages.

* cited by examiner

*Primary Examiner*—Bhavesh Mehta
*Assistant Examiner*—Gregory Desire
(74) *Attorney, Agent, or Firm*—Blakely, Sokoloff, Taylor & Zafman LLP

(57) ABSTRACT

A method and apparatus for managing resources. The apparatus includes a pattern recognition block to receive the video signal comprising an eye image and to generate a first signal indicating an orientation of the eye image; and an operating system to manage resources depending on the first signal.

18 Claims, 4 Drawing Sheets

EYE TRACKING FOR RESOURCE AND POWER MANAGEMENT

BACKGROUND OF THE INVENTION

1. Field of the Invention

The present invention relates to the field of resource and power management; more particularly, the present invention relates to a method and apparatus for eye tracking to manage power and resources.

2. Description of Related Art

A computer system often concurrently runs several applications under an operating system. Each application uses computer resources, such as the central processing unit (CPU) and monitor. For example, multiple video streams may be displayed on a monitor. Each video stream uses computer resources and power to maintain even though a user usually focuses on one or two video streams at a time. This results in resources and power being used by applications that the user may not regard as a priority at that time.

The operating system generally controls the allocation of resources between the applications based on some user input. For example, the user may be able to select a priority level, such as high, medium, or low, for each application. In addition, in an operating system with a graphical user interface (GUI), the user may use a mouse to select which windows are displayed on top of a group of windows. The operating system uses information, such as the priority level and which windows are on top, to allocate resources according to a predetermined algorithm.

Although these operating systems allow the user to change the priority level of various applications, it requires that the user take steps to manage the priority level on an ongoing basis. Thus, when the user decides that a different application is now a higher priority, the user would have to change the priority level associated with that application or use the mouse to bring a window associated with that application to the top of the group of windows. This can be tedious.

The issue is further exacerbated in computer systems that employ multiple monitors. Some of these monitors may be using power and computer resources to display video streams that are not being observed by the user, This needlessly uses power and generates heat. The user could turn off the monitors not being currently observed, but this user input can be tedious when the user changes looks at different monitors relatively frequently.

What is needed is a method and apparatus to manage resources efficiently and reduce power consumption and heat generation.

SUMMARY OF THE INVENTION

A method and apparatus for managing resources. The apparatus includes a pattern recognition block to receive the video signal comprising an eye image and to generate a first signal indicating an orientation of the eye image; and an operating system to manage resources depending on the first signal.

DETAILED DESCRIPTION

A method and apparatus to manage resources efficiently and reduce power consumption. In one embodiment, the method and apparatus manages computer resources, such as a central processing unit (CPU), in response to an eye-tracking signal.

Figure 1:
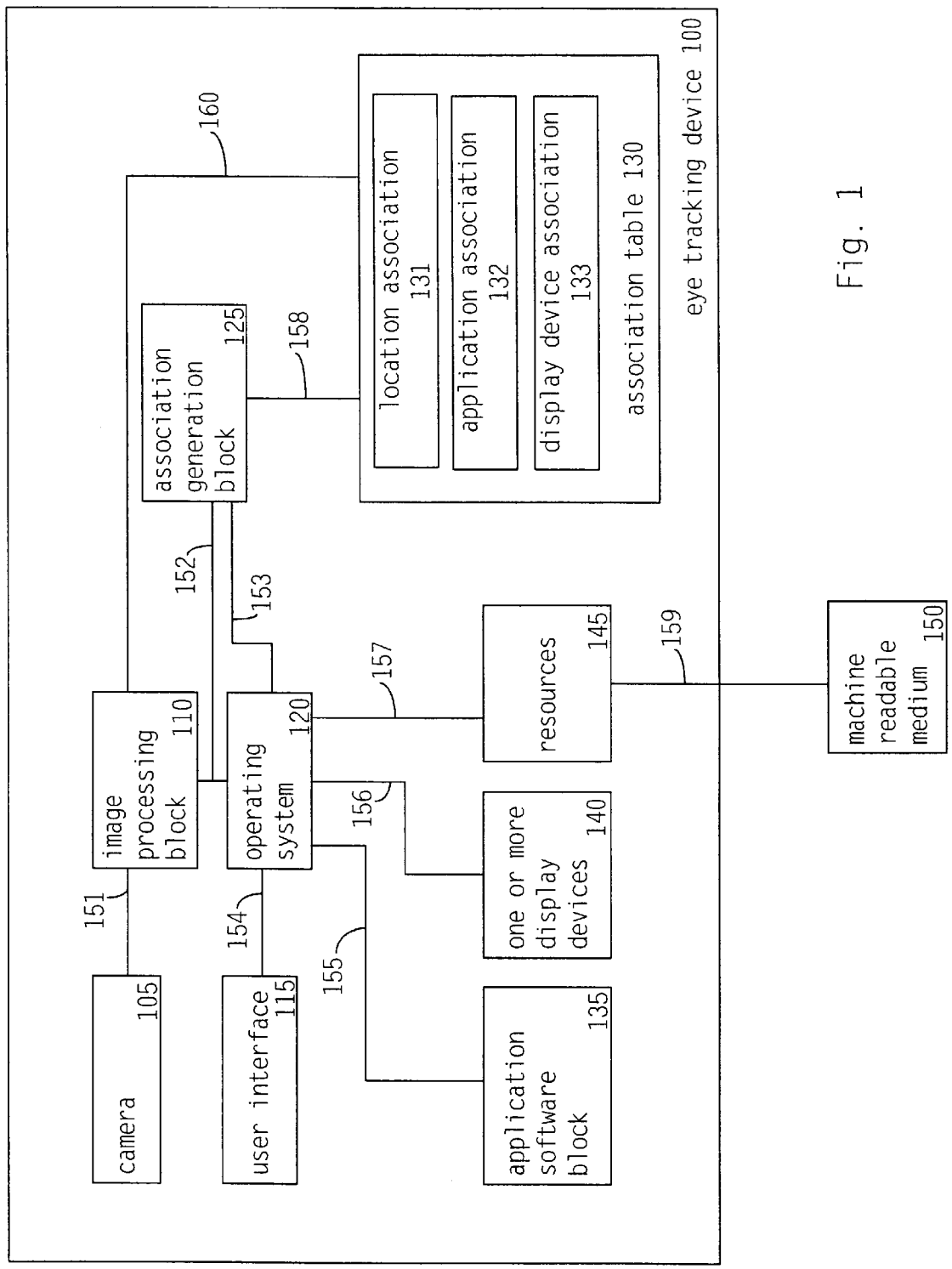
FIG. 1 is a diagram illustrating an eye tracking device according to one embodiment.

FIG. 1 is a diagram illustrating an eye tracking device according to one embodiment.

An eye tracking device 100 includes a camera 105, an image processing block 110, a user interface 115, an operating system 120, an association generation block 125, an association table 130, an application software block 135, one or more display devices 140, and resources 145.

The camera 105 is directed towards a user to collect images that includes an image of one or both of the user's eyes (eye image). For example, the user may be sitting at a desk looking at a computer display device. The camera generates a video image signal on a link 151. In one embodiment, the camera 105 is a digital camera. Alternatively, the camera 105 is an analog camera.

An image processing block 110 is coupled to receive the video image signal on the link 151 and to generate an eye-tracking signal on a link 152. The eye-tracking signal indicates the orientation of one or both of the eyes as determined by performing image processing of the video image signal according to well-known image processing techniques. The orientation of the eye image is used to determine where the user is looking.

The operating system 120 is configured to manage an application software block 135 through a link 155, one or more display devices 140 through a link 156, and resources 145 through a link 157. In one embodiment, the resources 145 include a central processor unit (CPU). In another embodiment, the resources 145 include one or more network connections, disk drives, tape drives, and compact-disc read-only-memories (CD-ROMs). The resources 145 may include other devices.

The application software block 135 includes one or more applications running under the operating system 120. A user interacts with the operating system 120 through the user interface 115 connected to the operating system 120 through a link 154. The user-interface 115 may be a keyboard, speech recognition device, or a mouse, for example.

The association generation block 125 receives the eye-tracking signal on the link 152 and status information from the operating system 120 through a link 153. The association generation block 125 generates associations between the status information and the eye-tracking signal.

In one embodiment, an association is made between a location on one or more of the display devices 140 and the eye-tracking signal by displaying a target image on one or more of the display devices 140 and requesting that the user look at the target image. The operating system 120 provides the target image by sending a video signal to the selected one of the display devices 140. When the operating system 120 receives a notification from the user interface 115 that the user has the desired eye-orientation (looking at the target image), the operating system 120 indicates that the user has the desired eye-orientation to the association generation block 125. The association generation block 125 then stores an association between that location on one of the display devices 140 and the eye-tracking signal (a location association).

Alternatively, associations are made between an application and the eye-tracking signal (application association) by identifying an application and requesting that the user look at a location to be associated with that application. For example, the user may look at a printed calendar hanging on the wall and the resulting eye orientation may be associated with the calendar application on a computer system.

In another embodiment, an association is made between a particular display device of the one or more display devices 140 and the eye-tracking signal (display device association). In one embodiment, the operating system 120 identifies a particular display device and requests that the user look at a location to be associated with that display device. Alternatively, the operating system 120 uses location associations to associate eye orientations with a particular display device.

The association table 130 includes a location association 131, an application association 132, and a display device association 133. More associations may be stored in the association table 130. The associations described above are provided as examples. Other associations may be used.

The associations from the association table 130 are provided to the image processing block 110 via a link 160. The image processing block 110 analyzes the eye-orientation signal to determine if the eye-orientation signal has an association.

If the the image processing block 110 indicates to the operating system 120 that the eye-orientation has a location association, the image processing block 110 indicates the associated location to the operating system 120. The operating system 120 determines which application is associated with that location. For example, if the operating system 120 is displaying an application window associated with a first application in a particular portion of a first display device and the image processing device 110 indicates that the user is looking at that location, the operating system 120 determines that the first application is associated with that eye-orientation. As the location of application windows on a particular display device changes, that location may be associated with other applications.

If the the image processing block 110 indicates to the operating system 120 that the eye-orientation has an application association, the image processing block 110 indicates the associated application to the operating system 120. For example, if the user looks at a printed calendar hanging on a wall, the image processing block indicates that the calendar application is associated with the eye-orientation signal.

If the operating system 120 receives an indication that the user has an eye-orientation associated with a particular application either through a location association or an application association, for example, the operating system 120 adjusts the allocation of the resources 145 appropriately. In one embodiment, the operating system 120 redistributes more of the resources 145 to that particular application.

In one embodiment, the resources 145 include a CPU. The operating system 120 redistributes more of the CPU processing time to processing a particular application in response to an indication that the user is looking at a location associated with that application (associated application). The operating system 120 may redistribute other resources 145, such as network connections, disk drives, tape drives, CD-ROMs, for example, to the associated application. In one embodiment, redistribution provides sole access to the resource to the application to which that resource is redistributed. Alternatively, redistribution may provide an increased priority level relative to other applications such that the associated application is more likely to gain access to that resource when the associated application requests access.

In one embodiment, a display device of the display devices 140 enters a standby mode when the user has not looked at that display device for a period of time. Standby mode may be any alternate mode for the display device. In one embodiment, standby mode reduces power consumption and heat generation by turning off the display. Alternatively, standby mode may reduce the intensity of the display. In yet another embodiment, there may be different levels of standby mode for different durations. For example, after the display device remains unobserved for five minutes, the intensity of the display is reduced. After the display device remains unobserved for ten minutes, the display is turned off.

When a user looks at a display device that is in standby mode, the operating system 120 identifies that display device using a location association or a display device association, for example, and causes the associated display device to enter an active mode. In one embodiment, active mode is a mode in which the display device is fully functional. Thus, only the display devices that have been recently viewed will be in active mode. Other display devices will remain in standby mode. This reduces power consumption and heat generation.

In one embodiment, the image processing block 110 and the association generation block 125 are implemented in hardware. Alternatively, the image processing logic 110 and the association generation block 125 are implemented as software. In one embodiment, the image processing logic 110 and the association generation block 125 are implemented as an application running under the operating system 120.

The links may be any means of transferring information and instructions between software and hardware blocks. In one embodiment, some of the links are hardware busses. Alternatively, some of the links are software configured to pass information. In yet another embodiment, some of the links are a combination of hardware and software to interface software, such as the operating system 120, to hardware, such as the one or more display devices 140.

In one embodiment, the resources 145 include an I/O device. The I/O device may be any device capable of transferring information to a local or a remote location. For example, the I/O device may include a redundant array of inexpensive disks (RAID), a hard disk drive, a compact disk read-only-memory (CD-ROM) drive, a floppy disk drive, a tape drive, a network device (capable of interfacing to a local area network, for example). In one embodiment, the I/O device is capable of reading and/or writing to a machine readable medium 150 through an interface 159. The machine readable medium 150 may be a floppy disk, CD-ROM, or a tape cartridge, for example. The machine readable medium 150 may be a carrier wave such that information is contained in a signal that is superimposed on the carrier wave.

Figure 2:
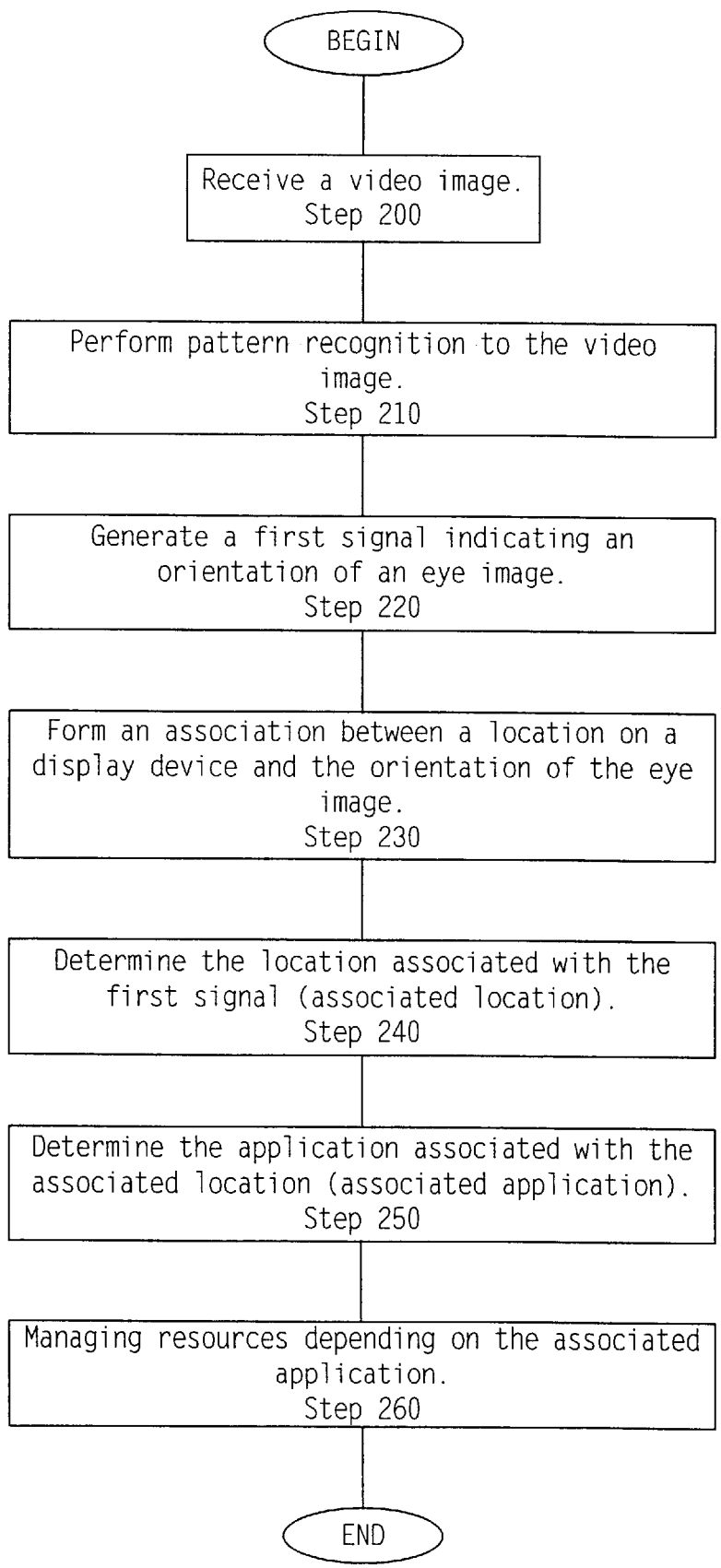
FIG. 2 is a diagram illustrating a method of eye tracking according to one embodiment.

FIG. 2 is a diagram illustrating a method for eye tracking according to one embodiment.

In Step 200, receive a video image including an eye image. In one embodiment, the video image is a digital signal. Alternatively, the video image is an analog signal.

In Step 210, perform pattern recognition on the video image according to well-known image processing techniques.

In Step 220, generate a first signal indicating one of a plurality of orientations of the eye image.

In Step 230, form an association with an orientation of the eye image. In one embodiment, associations are made between each location on one or more display devices and the eye-tracking signal by sequentially displaying a target image at a particular location on a particular display device and requesting that the user look at that location.

In Step 240, determine a particular location to which the first signal is associated (associated location).

In step 250, determine which application to which the associated location is associated (associated application). In one embodiment, the operating system has access to information indicating which application window is displayed at a particular location and to which application that application window is associated. Thus, given a particular location on a particular display device, the operating system determines which application is associated with that location. Alternatively, a particular location may be associated with a particular application regardless of which application is being displayed at that location.

In Step 260, manage resources depending on the associated application. In one embodiment, the operating system redirects all resources to the associated application. In another embodiment, the operating system increases the resources allocated to the associated application. As described with reference to FIG. 1, the resources may include CPU, network connections, disk drives, tape drives, and CD-ROMs.

Figure 3:
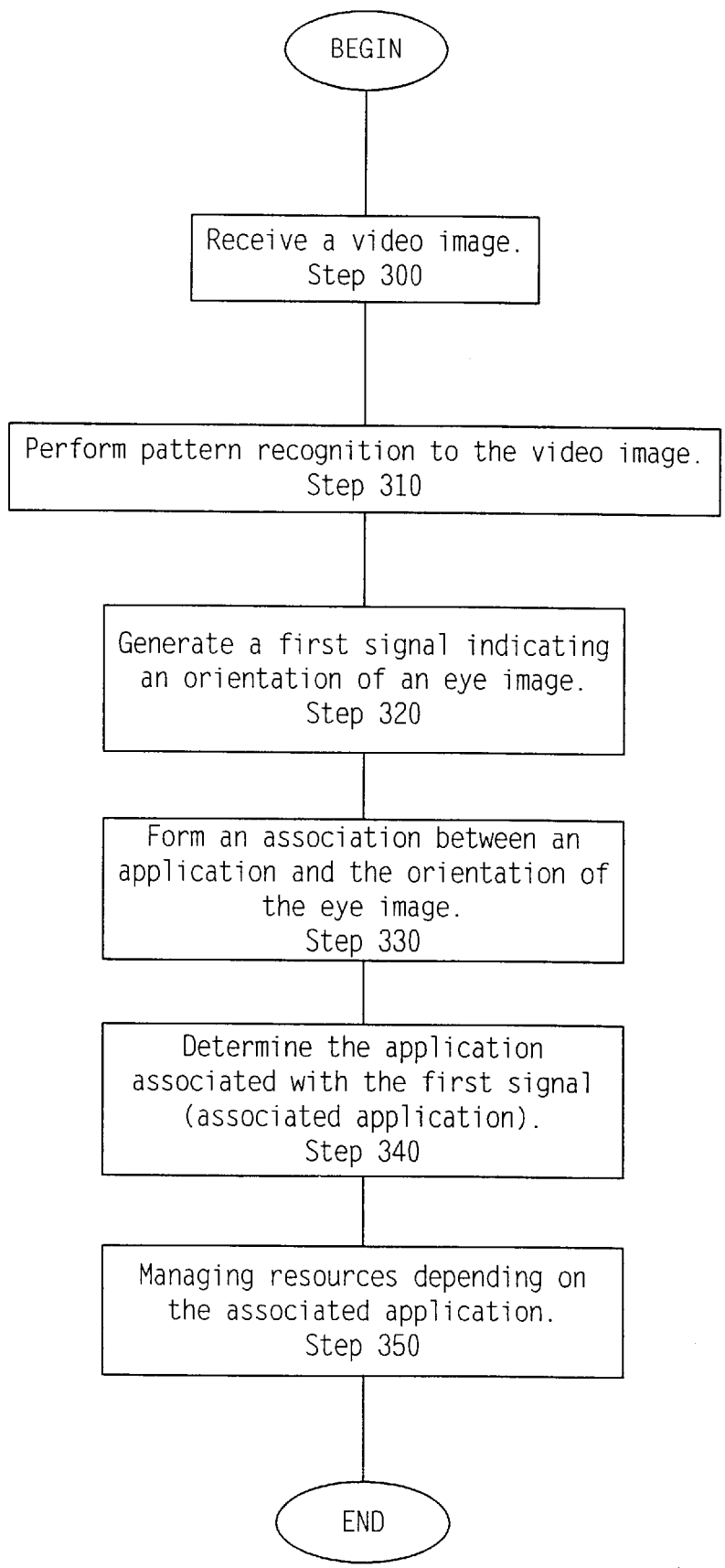
FIG. 3 is a diagram illustrating a method of eye tracking according to one embodiment.

FIG. 3 is a diagram illustrating a method for eye tracking according to one embodiment.

Steps 300–320 are performed as described with reference to Steps 200–220, respectively.

In Step 330, form an association with an orientation of the eye image. Associations are made between an application and the eye-tracking signal (application association) by identifying an application and requesting that the user look at a location. For example, the operating system may identify a calendar application and the user may look at a printed calendar hanging on the wall to form an application association.

In step 340, determine which application to which the first signal is associated (associated application).

In Step 350, manage resources depending on the associated application as described with reference to Step 260.

Figure 4:
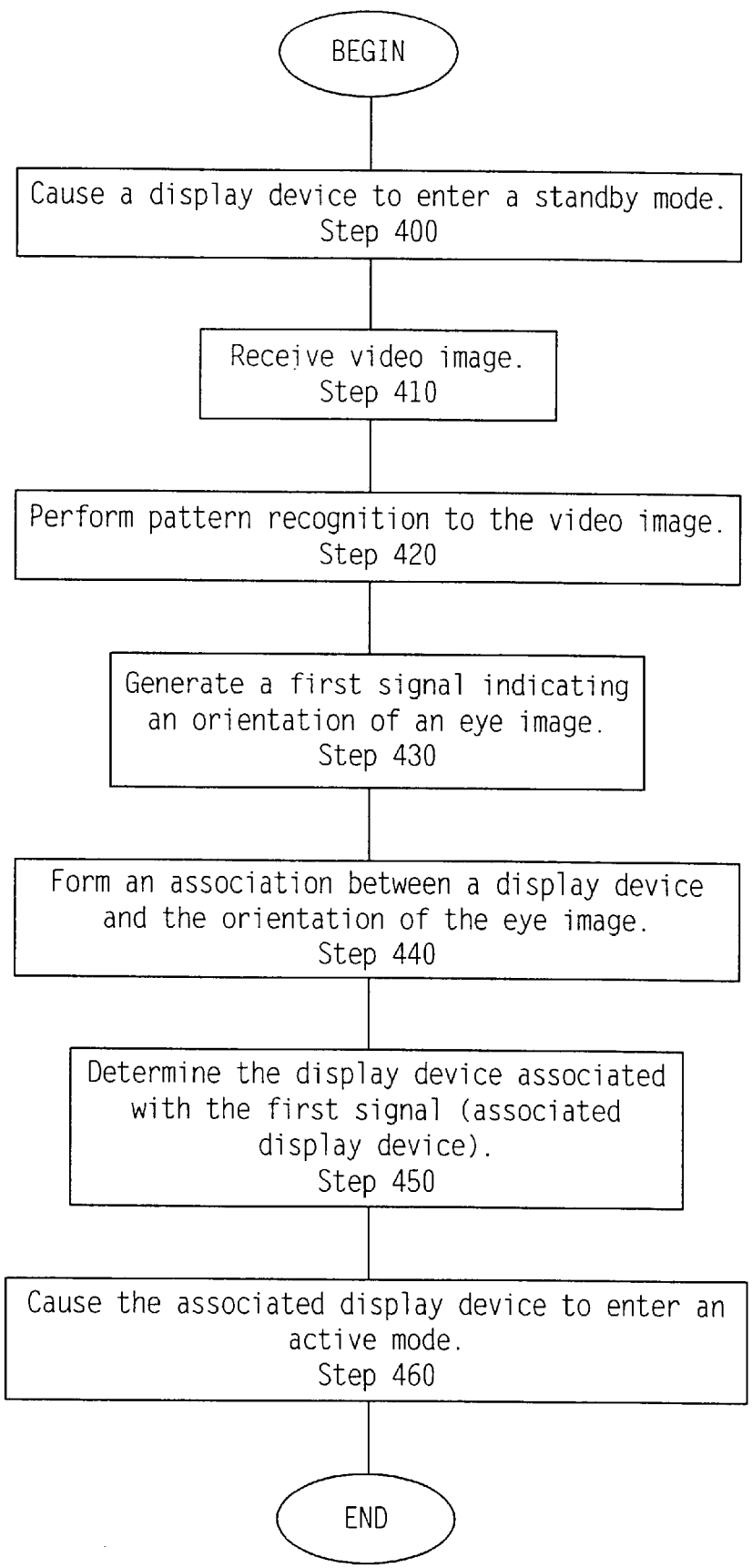
FIG. 4 is a diagram illustrating a method of eye tracking according to one embodiment.

FIG. 4 is a diagram illustrating a method for eye tracking according to one embodiment.

In Step 400, cause a display device to enter a standby mode. In one embodiment, an operating system causes a display device to enter a standby mode when the user has not looked at that display device for a period of time. Standby mode may be any alternate mode for the display device as described with reference to FIG. 1.

Steps 410–430 are performed as described with reference to Steps 200–220, respectively.

In Step 440, form an association between one of the display devices and the an orientation of the eye image. In one embodiment, the operating system identifies a particular display device and requests that the user look at a location to be associated with that display device. Alternatively, the operating system 120 uses location associations to associate eye orientations with a particular display device.

In Step 450, determine the particular display device of one or more display devices to which the first signal is associated (associated display device).

In Step 460, cause the associated display device to enter an active mode in response to the first signal. In one embodiment, the operating system causes the associated display device to enter active mode. Active mode is described with reference to FIG. 1.

In the above detailed description, numerous specific details are set forth in order to provide a thorough understanding of the described invention. Some of these specific details need not be used to practice the invention. In other instances, well-known structures, signals, and methods have not been shown in detail in order not to obscure the described invention.

What is claimed is:

1. An apparatus comprising:
    a pattern recognition block to receive a video signal comprising an eye image and to generate a first signal indicating one of a plurality of orientations of the eye image;
    an association generation block to receive the first signal and to generate an association between one of a plurality of display devices and the orientation of the eye image; and
    an operating system to change the resources allocated to the display device depending on the association.

2. An apparatus comprising:
    a pattern recognition block to receive a video signal comprising an eye image and to generate a first signal indicating one of a plurality of orientations of the eye image;
    an association generation block to receive the first signal and to generate an association between an application and the orientation of the eye image; and
    an operating system to change computer resources allocated to the application depending on the association.

3. An apparatus comprising:
    a pattern recognition block to receive a video signal comprising an eye image and to generate a first signal indicating one of a plurality of orientations of the eye image;
    an association generation block to receive the first signal and to generate an association between an application and the orientation of the eye image; and
    an operating system to change a priority level of the application depending on the association.

4. The apparatus of claim 3 wherein the operating system changes computer resources allocated to the application in relation to the change in the priority level of the application.

5. An apparatus comprising:
    a pattern recognition block to receive a video signal comprising an eye image and to generate a first signal indicating one of a plurality of orientations of the eye image;
    an operating system to change a priority level of an application in response to the first signal.

6. The apparatus of claim 5 wherein the operating system changes computer resources allocated to the application in relation to the change in the priority level of the application.

7. A method comprising:
    receiving a video signal comprising an eye image;
    performing pattern recognition on the eye image to generate a first signal indicating one of a plurality of orientations of the eye image;
    forming an association between one of a plurality of display devices and the orientation of the eye image indicated by the first signal; and changing resources allocated to the display device depending on the association.

8. A method comprising:

receiving a video signal comprising an eye image;

performing pattern recognition on the eye image to generate a first signal indicating one of a plurality of orientations of the eye image;

forming an association between an application and the orientation of the eye image indicated by the first signal; and changing computer resources allocated to the application depending on the association.

9. A method comprising:

receiving a video signal comprising an eye image;

performing pattern recognition on the eye image to generate a first signal indicating one of a plurality of orientations of the eye image;

forming an association between an application and the orientation of the eye image indicated by the first signal; and changing a priority level of the application depending on the association.

10. The method of claim 9 further comprising changing computer resources allocated to the application in relation to the change in the priority level of the application.

11. A method comprising:

receiving a video signal comprising an eye image;

performing pattern recognition on the eye image to generate a first signal indicating one of a plurality of orientations of the eye image; and changing a priority level of an application in response to the first signal.

12. The method of claim 11 further comprising changing computer resources allocated to the application in relation to the change in the priority level of the application.

13. A machine accessible medium having stored thereon data, which when accessed by a machine causes the machine to perform the method of claim 7.

14. A machine accessible medium having stored thereon data, which when accessed by a machine causes the machine to perform the method of claim 8.

15. A machine accessible medium having stored thereon data, which when accessed by a machine causes the machine to perform the method of claim 9.

16. The machine accessible medium of claim 15 having stored thereon further data, which when accessed by a machine causes the machine to perform the method of claim 10.

17. A machine accessible medium having stored thereon data, which when accessed by a machine causes the machine to perform the method of claim 11.

18. The machine accessible medium of claim 17 having stored thereon further data, which when accessed by a machine causes the machine to perform the method of claim 12.

* * * * *